US009860893B2

United States Patent
Azizi et al.

(10) Patent No.: US 9,860,893 B2
(45) Date of Patent: Jan. 2, 2018

(54) FRAME STRUCTURE WITH REDUCED SIGNAL FIELD AND METHOD FOR HIGH-EFFICIENCY WI-FI (HEW) COMMUNICATION

(71) Applicant: Intel IP Corporation, Santa Clara, CA (US)

(72) Inventors: Shahrnaz Azizi, Cupertino, CA (US); Thomas J. Kenney, Portland, OR (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 74 days.

(21) Appl. No.: 15/021,983

(22) PCT Filed: Dec. 6, 2013

(86) PCT No.: PCT/US2013/073705
§ 371 (c)(1),
(2) Date: Mar. 15, 2016

(87) PCT Pub. No.: WO2015/076854
PCT Pub. Date: May 28, 2015

(65) Prior Publication Data
US 2016/0234697 A1    Aug. 11, 2016

Related U.S. Application Data

(60) Provisional application No. 61/906,059, filed on Nov. 19, 2013.

(51) Int. Cl.
H04W 24/02 (2009.01)
H04W 72/04 (2009.01)
(Continued)

(52) U.S. Cl.
CPC ........ *H04W 72/044* (2013.01); *H04B 7/0413* (2013.01); *H04B 7/0452* (2013.01);
(Continued)

(58) Field of Classification Search
CPC ..................................................... H04W 24/02
See application file for complete search history.

(56) References Cited

U.S. PATENT DOCUMENTS

2011/0075759 A1    3/2011   Seok
2012/0269124 A1    10/2012  Porat
(Continued)

FOREIGN PATENT DOCUMENTS

CN           105612698 A      5/2016
WO     WO-2013073921 A1      5/2013

OTHER PUBLICATIONS

"International Application Serial No. PCT/US2013/073705, International Search Report dated Aug. 19, 2014", 4 pgs.
(Continued)

*Primary Examiner* — John Blanton
(74) *Attorney, Agent, or Firm* — Schwegman Lundberg & Woessner, P.A.

(57) ABSTRACT

Embodiments of a high-efficiency Wi-Fi (HEW) device and method for HEW communicating are generally described herein. In some embodiments, an HEW frame is configured with a reduced signal field. The HEW frame may include a HEW signal field (HEW SIG-A1) which may include a single bit to indicate whether the HEW frame is a single user (SU) HEW frame or a multi-user (MU) HEW frame. A legacy signal field (L-SIG) is not included in the HEW frame. Rate information may be included in one or more signal fields that follow the HEW SIG-A1 and length information may be included in either the HEW SIG-A1 or the one or more signal fields that follow the HEW SIG-A1.
(Continued)

The HEW frame may improve overall system efficiency, particularly in high-density deployment situations.

26 Claims, 2 Drawing Sheets

(51) Int. Cl.

| | |
|---|---|
| *H04W 4/00* | (2009.01) |
| *H04L 5/00* | (2006.01) |
| *H04L 27/26* | (2006.01) |
| *H04B 7/0452* | (2017.01) |
| *H04B 17/336* | (2015.01) |
| *H04J 11/00* | (2006.01) |
| *H04L 29/06* | (2006.01) |
| *H04W 56/00* | (2009.01) |
| *H04W 52/02* | (2009.01) |
| *H04B 7/0413* | (2017.01) |
| *H04W 74/04* | (2009.01) |
| *H04W 84/12* | (2009.01) |

(52) U.S. Cl.
CPC ............ *H04B 17/336* (2015.01); *H04J 11/00* (2013.01); *H04L 5/005* (2013.01); *H04L 5/0007* (2013.01); *H04L 5/0048* (2013.01); *H04L 5/0053* (2013.01); *H04L 5/0064* (2013.01); *H04L 27/2601* (2013.01); *H04L 27/2602* (2013.01); *H04L 27/2613* (2013.01); *H04L 27/2695* (2013.01); *H04L 69/22* (2013.01); *H04W 4/008* (2013.01); *H04W 24/02* (2013.01); *H04W 52/0216* (2013.01); *H04W 52/0219* (2013.01); *H04W 56/002* (2013.01); *H04W 72/0413* (2013.01); *H04W 72/0453* (2013.01); *H04W 74/04* (2013.01); *H04J 2011/0096* (2013.01); *H04L 5/0023* (2013.01); *H04W 84/12* (2013.01); *Y02B 60/50* (2013.01)

(56) References Cited

U.S. PATENT DOCUMENTS

| | | | | |
|---|---|---|---|---|
| 2012/0294294 A1* | 11/2012 | Zhang | ............... | H04L 1/0025 370/338 |
| 2013/0216002 A1* | 8/2013 | Suh | ............ | H04L 27/2613 375/308 |
| 2015/0382333 A1* | 12/2015 | Seok | ............ | H04W 74/0808 370/338 |
| 2016/0301491 A1* | 10/2016 | Porat | ............ | H04W 24/08 |

OTHER PUBLICATIONS

"International Application Serial No. PCT/US2013/073705, Written Opinion dated Aug. 19, 2014", 5 pgs.

Al-Ghazu, Nader, "A Study of the Next WLAN Standard IEEE 802.11ac Physical Layer", Master of Science Thesis Stockholm, (Jan. 2013).

Oh, Jinhyung, et al., "Distributed implicit interference alignment in 802.11ac WLAN network", International Conference on ICT Convergence (ICTC), (Oct. 2013), 421-426.

Zhang, Wenxuan, et al., "A novel high throughput long training field sequence design for Next-generation WLAN", Wireless Telecommunications Symposium (WTS), (Apr. 2011).

"European Application Serial No. 13897925.7, Extended European Search Report dated Jul. 20, 2017", 8 pgs.

"International Application Serial No. PCT/US2013/073705, International Preliminary Report on Patentability dated Jun. 2, 2016", 7 pgs.

Jinyoung, Chun, et al., "Legacy Support on HEW frame structure", IEEE Draft; 11-13-1057-00-0HEW-Legacy-Support-On-HEW-Frame-Structure, IEEE-SA Mentor, Piscataway NJ USA, vol. 802. 11 HEW, (Sep. 16, 2013), 1-8.

* cited by examiner

| FIELD | HEW MU PPDU ALLOCATION (BITS) | | | HEW SU PPDU ALLOCATION (BITS) | | | DESCRIPTION |
|---|---|---|---|---|---|---|---|
| | 20 MHz | 40 MHz | 80 MHz, 160 MHz, 80+80 MHz | 20 MHz | 40 MHz | 80 MHz, 160 MHz, 80+80 MHz | |
| HEW SIG-B LENGTH | B0-B15 (16) | B0-B16 (17) | B0-B18 (19) | B0-B16 (17) | B0-B18 (19) | B0-B20 (21) | LENGTH OF A-MPDU PRE-EOF PADDING IN UNITS OF 4 OCTETS |
| HEW-MCS | B16-19 (4) | B17-20 (4) | B19-22 (4) | N/A | N/A | N/A | |
| RESERVED | N/A | N/A | N/A | B17-19 (3) | B19-20 (2) | B21-22 (2) | ALL ONES |
| TAIL | B20-25 (6) | B21-26 (6) | B23-28 (6) | B20-25 (6) | B21-26 (6) | B23-28 (6) | ALL ONES |
| TOTAL No. BITS | 26 | 27 | 29 | 26 | 27 | 29 | |

FRAME STRUCTURE WITH REDUCED SIGNAL FIELD AND METHOD FOR HIGH-EFFICIENCY WI-FI (HEW) COMMUNICATION

PRIORITY CLAIM

This application is a U.S. National Stage Filing under 35 U.S.C. 371 from International Application No. PCT/US2013/073705, filed Dec. 6, 2013 and published in English as WO 2015/076854 on May 28, 2015, which claims the benefit of priority to U.S. Provisional Patent Application Ser. No. 61/906,059, filed Nov. 19, 2013, each of which is incorporated herein by reference in its entirety.

TECHNICAL FIELD

Embodiments pertain to wireless networks. Some embodiments relate to Wi-Fi networks and networks operating in accordance with one of the IEEE 802.11 standards. Some embodiments relate to high-efficiency wireless or high-efficiency Wi-Fi (HEW) communications.

BACKGROUND

Wi-Fi communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements. The frame structure used for conventional and legacy IEEE 802.11 communications including very-high throughput (VHT) communications may be less suitable for such high-density deployment situations. A recently-formed study group for Wi-Fi evolution referred to as the IEEE 802.11 High Efficiency Wi-Fi (HEW) study group (SG) is addressing these high-density deployment scenarios.

Thus, there are general needs for devices and methods that improve overall system efficiency, particularly for high-density deployment situations. There are also general needs for frame structures suitable for HEW communications.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
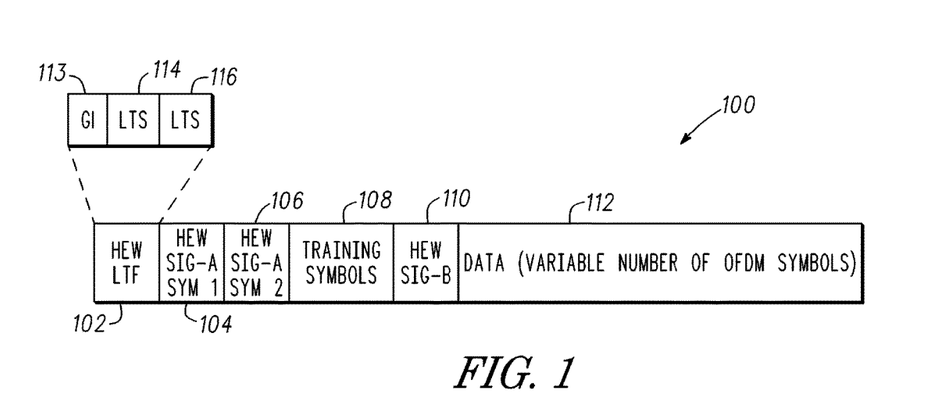
FIG. 1 illustrates the structure of an HEW frame in accordance with some embodiments.

FIG. 1 illustrates the structure of an HEW frame in accordance with some embodiments. HEW frame 100 may include an HEW long-training field (LTF) 102, a first HEW signal field (HEW SIG-A1) 104, a second HEW signal field (HEW SIG-A2) 106, training symbols 108, a third HEW signal field (HEW SIG-B) 110, and a data field 112. In these embodiments, an access point, base station or enhanced node B (eNB) operating as a master station may configure the HEW frame 100 to include at least some of these fields. In some embodiments, the HEW SIG-A1 104 may be the first symbol (Sym 1) and the HEW SIG-A2 106 may be the second symbol (Sym 2) of an HEW signal field (HEW SIG-A) that may consist of two symbols. The HEW frame 100 may be transmitted as part of a packet protocol data unit (PPDU).

In these embodiments, a legacy signal field (L-SIG) is not included or needed in the HEW frame 100. These embodiments as well as the L-SIG are described in more detail below.

In accordance with some embodiments, the HEW SIG-A1 104 may include a single bit to indicate whether the HEW frame 100 is a single user (SU) HEW frame or a multi-user (MU) HEW frame. In these embodiments, the single bit that may be used to indicate whether the HEW frame 100 is a SU frame or a MU frame may be included in a SU/MU field of the HEW SIG-A1 104. These embodiments are described in more detail below.

The frame structure of HEW frame 100 may be utilized during scheduled or queried exchanges of HEW compliant devices and includes new signal fields that result in a reduction in overhead while maintaining coexistence with legacy IEEE 802.11 devices. Accordingly, the frame structure of HEW frame 100 may be suitable for high-density deployment scenarios, including hotspot and cellular offloading scenarios.

As mentioned above, an L-SIG field is not included in the HEW frame 100. A conventional L-SIG would include a rate field, a length field and tail bits as part of the L-SIG and would be included in conventional frames including conventional very-high throughput (VHT) frames. In accordance with embodiments, rate information may be included in one or more HEW signal fields that follow the HEW SIG-A1 104, such as the HEW SIG-A2 106 and/or the HEW SIG-B 110. Length information may be included in either the HEW SIG-A1 104 or the one or more HEW signal fields that follow the HEW SIG-A1 104 such as the HEW SIG-A2 106 and/or the HEW SIG-B 110. Accordingly, a conventional L-SIG is not needed to convey rate and/or length information. In some embodiments, the conventional L-SIG may be in accordance one of the IEEE 802.11 standards such as the IEEE 802.11a/b/g/n standards, the IEEE 802.11n-2009 standard or the IEEE 802.11-2012 standard, for example. These embodiments are described in more detail below.

In a conventional non-HEW frame (a legacy frame that is intended for conventional 20 MHz devices and VHT devices), an L-SIG would normally be included immediately after a long-training field, such as field 102. The rate field of the L-SIG was conventionally used to spoof legacy devices to defer their transmission. In HEW embodiments, a master-sync transmission may be transmitted a-priori (i.e., prior to transmission of an HEW frame, such as HEW frame 100) causing the legacy devices to defer their transmission.

Accordingly, a conventional L-SIG with a rate field is no longer needed to spoof legacy devices. In these embodiments, when configuring the HEW frame 100, the access point may refrain from including an L-SIG in the HEW frame 100.

In some embodiments, the HEW frame 100 may also include a preamble comprising the HEW LTF 102 at the beginning of the HEW frame 100. The HEW LTF 102 may include, for example, a guard interval (GI) 113, and one or more long-training sequences such as long-training sequence (LTS) 114 and LTS 116. LTS 116 may be a repeat of LTS 114. The HEW frame 100 may be configured to include the HEW SIG-A1 104 to immediately follow the HEW LTF 102. In these embodiments, the access point may refrain from including the L-SIG after the HEW LTF 102 when configuring the HEW frame 100. In these embodiments, no L-SIG is included in between the HEW LTF 102 and the HEW SIG-A1 104 in the HEW frame 100. For non-HEW communications, the access point may include an L-SIG in a conventional non-HEW frame immediately following a training field.

In some embodiments, a short training field (STF) is not included before the HEW LTF 102 in HEW frame 100. An example of a STF would be the legacy STF (L-STF) conventionally used in IEEE 802.11 networks. In some alternate embodiments, the HEW LTF 102 is not included in HEW frame 100 as synchronization may be performed based on the master-sync transmission.

In some embodiments, the HEW frame 100 may be used for scheduled and queried exchanges between IEEE 802.11 HEW compliant devices. In some embodiments, these HEW frames may include master-sync transmissions as well as other HEW communications that do not need to be decodable by legacy devices. For example, frames communicated with HEW devices during an HEW orthogonal-frequency division multiple access (OFDMA) control period may be configured as an HEW frame 100, although this is not a requirement. In these embodiments, the master-sync transmission and the frames communicated with HEW devices during the HEW OFDMA control period may be communicated during a transmission opportunity (TXOP) obtained by the access point.

In some embodiments, the HEW training symbols 108 may comprise training sequences in the form of orthogonal frequency division multiplexed (OFDM) symbols. In some embodiments, the training symbols may be specifically designated for HEW communications, although this is not a requirement.

Figure 2:
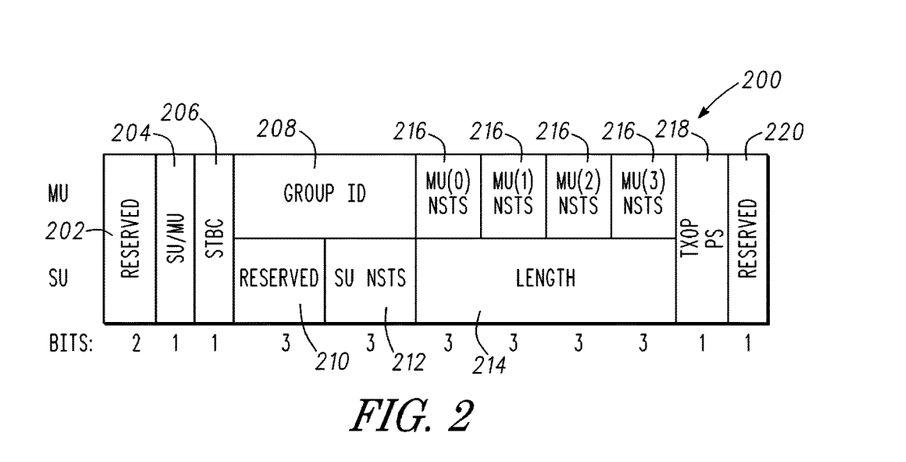
FIG. 2 illustrates the structure of a first HEW signal field (HEW SIG-A1) in accordance with some embodiments.

FIG. 2 illustrates the structure of a HEW SIG-A1 in accordance with some embodiments. HEW SIG-A1 200 may be suitable for use as HEW SIG-A1 104 (FIG. 1) although other signal field configurations may also be suitable. HEW SIG-A1 200 may include reserved field 202, SU/MU field 204, STBC field 206, TXOP PS field 218 and reserved field 220. When HEW frame 100 (FIG. 1) is a single user (SU) HEW frame, HEW SIG-A1 200 may include reserved field 210, SU NSTS field 212 and length field 214. When HEW frame 100 is a multi-user (MU) HEW frame, HEW SIG-A1 200 may include a group ID field 208 and MU NSTS fields 216. In these embodiments, SU/MU field 204 may include the single bit to indicate whether the HEW frame 100 is a SU HEW frame or a MU HEW frame.

In accordance with some embodiments, when configuring the HEW frame 100 to be a SU frame, the access point may include the length field 214 in the HEW SIG-A1 200 to indicate a length of the PPDU. The access point may refrain from including a length field in the HEW SIG-A1 200 when the HEW frame 100 is a MU HEW frame. In these embodiments, for MU HEW frames, the PPDU length may be determined from length fields of the HEW SIG-B field 110 (FIG. 1) discussed in more detail below.

STBC field 206 may indicate if space-time block coding (STBC) is used. SU NSTS field 212 and MU NSTS fields 216 may indicate the number of space-time streams (NSTS) included in the PPDU. Beamforming may be used when more than one spatial stream is transmitted. TXOP PS field 218 may indicate whether power saving (PS) is allowed or not allowed for this TXOP.

In accordance with embodiments, the HEW frame 100 may be configured so that the HEW SIG-A2 106 is to immediately follow the HEW SIG-A1 200. For SU HEW frames, the HEW SIG-A2 106 may indicate at least rate information comprising a modulation and coding scheme (MCS) of the data field 112 (FIG. 1) of the HEW frame 100. The data field 112 may be configurable to comprise a variable number of coded OFDM symbols.

Figure 3:
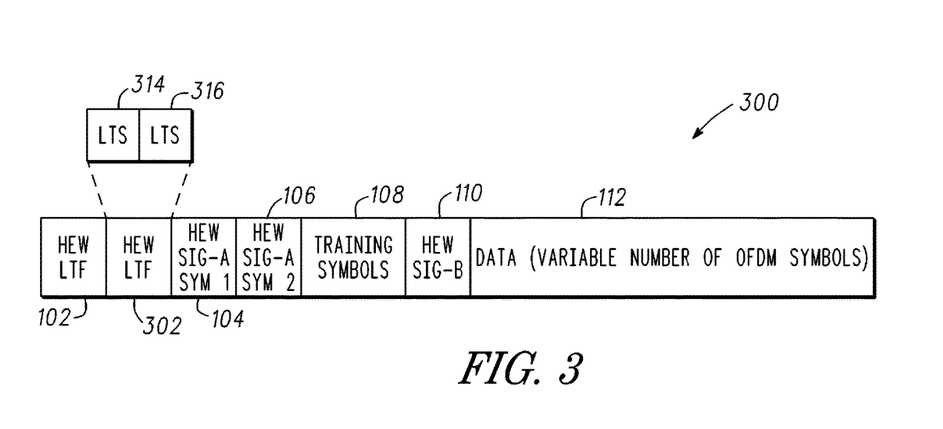
FIG. 3 illustrates an alternate structure of an HEW frame in accordance with some embodiments.

FIG. 3 illustrates an alternate structure of an HEW frame in accordance with some embodiments. Alternate HEW frame 300 may be suitable for use as an alternate to HEW frame 100 (FIG. 1). In these embodiments, alternate HEW frame 300 may further include a second HEW LTF 302 that may include an additional one or more long-training sequences, such as first LTS 314 and second LTS 316. The second HEW LTF 302 may be included in the HEW frame 300 immediately following the HEW LTF 102 and prior to the HEW SIG-A1 104 as illustrated in FIG. 3.

In these embodiments, the same training sequence may be repeated (e.g., four times) at the beginning of the HEW frame 100 (e.g., twice in each HEW LTF), although this is not a requirement. In some embodiments, a guard interval may be included prior to the second HEW LTF 302 although this is not a requirement. In some embodiments, each LTS may be preceded with a guard interval. In some alternate embodiments, a single guard interval, such as GI 113 (FIG. 1) may precede a first of the several (e.g., four) long training sequences and these long training sequences may not have a guard interval in between.

In some embodiments, when configuring the HEW frame 300, the access point may include the second HEW LTF 302 when the signal-to-noise ratio (SNR) of the channel is below a predetermined level (i.e., low SNR situations) and may refrain from including the second HEW LTF 302 when the SNR is not below a predetermined level. The additional LTF may help HEW devices synchronize with the transmission in lower SNR scenarios. In some of these embodiments, the SNR may be determined based on channel estimates performed by the access point with the assumption of channel reciprocity, although that is not a requirement as any of the HEW devices may be arranged to provide channel information or an indicator as to whether or not the second HEW LTF 302 should be included in the HEW frame 100.

In some embodiments, with several (e.g., four) LTSs, HEW devices that have lost their synchronization from the last time they received the master-sync transmission may be able to resynchronize by performing an autocorrelation to detect the start of an HEW specific packet.

In some embodiments, the use of this alternative structure (HEW frame 300 vs. HEW frame 100) may be dynamically signaled via a prior message exchange. For example, a master-sync transmission may indicate to the intended receiver to expect the alternative structure.

Figure 4:
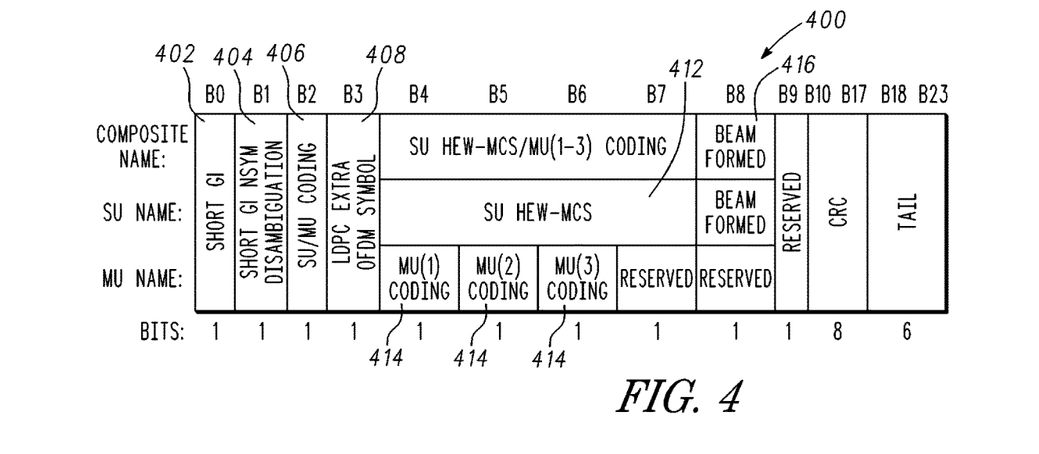
FIG. 4 illustrates the structure of a second HEW signal field (HEW SIG-A2) in accordance with some embodiments.

FIG. 4 illustrates an example of a second HEW signal field (HEW SIG-A2) in accordance with some embodiments. The HEW SIG-A2 400 may be suitable for use as HEW SIG-A2 106 (FIG. 1), although this is not a requirement as other signal field configurations may also be suitable. Among other fields, HEW SIG-A2 400 may include one or more MCS fields, such as SU HEW MCS field 412, which may be used to convey the modulation and coding scheme (MCS) for SU frames, and MU coding fields 414 which may be used to convey the MCS for each HEW device for MU frames. In these embodiments, the rate information provided by an L-SIG is not needed because for SU HEW frames, the rate may be obtained from a SU HEW MCS field 412. The MU coding fields 414 may define individual coding (i.e., the MCS) for each MU device. In FIG. 4, three MU coding fields 414 are illustrated for three MU devices. The HEW SIG-A2 400 may also include beamformed fields 416 to indicate whether beamforming is used.

The HEW SIG-A2 400 may also include a short guard interval 402, a short GI NSYM disambiguation 404, a SU/MU coding field 406, and an extra OFDM symbol 408 for LDPC encoding. The short GI NSYM disambiguation 404 may be used to indicate whether a short GI is used for use in calculating the number of symbols (NSYM). The SU/MU coding field 406 may indicate whether the coding is for a SU frame or a MU frame.

Figure 5:
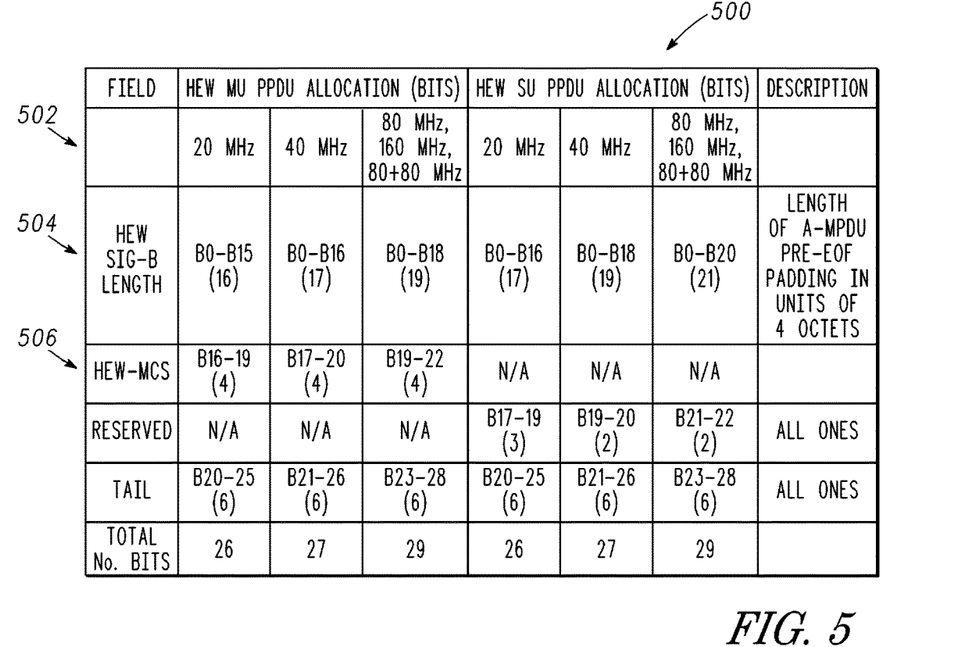
FIG. 5 illustrates fields of a third HEW signal field (HEW SIG-B) in accordance with some embodiments.

FIG. 5 illustrates fields of a third HEW signal field (HEW SIG-B) in accordance with some embodiments. The HEW SIG-B 500 may be suitable for use as HEW SIG-B 110 (FIG. 1), although other fields and structures may also be suitable. In accordance with embodiments, the access point may configure the HEW frame 100 (FIG. 1) to further include HEW training symbols 108 (FIG. 1) to immediately follow the HEW SIG-A2 106 (FIG. 1) and to include the HEW SIG-B 500 to immediately follow the HEW training symbols 108. In these embodiments, for MU HEW frames, the HEW SIG-B 500 may include at least a length field 504 to indicate a length of the PPDU and one or more fields, such as HEW MCS fields 506, to indicate the MCS or rate.

In these embodiments, the length field of an L-SIG is not needed as the PPDU length may be obtained from the HEW SIG-B 500. The rate field of the L-SIG is not needed as the rate for MU HEW frames may be obtained from the HEW SIG-B 500.

As illustrated in FIG. 5, the HEW SIG-B 500 may be configured for different bandwidths. In accordance with embodiments, bandwidths 502 may be indicated in the master-sync transmission. The indicated bandwidths include one of a 20 MHz bandwidth, a 40 MHz bandwidth, an 80 MHz bandwidth or a 160 MHz bandwidth, although the scope of the embodiments is not limited in this respect. In some embodiments, the various fields of the HEW SIG-B 500 may be configured based on the indicated bandwidth. For example, in the case of a MU HEW frame, when the HEW SIG-B 500 is configured for a 20 MHz bandwidth, the HEW SIG-B length field 504 may be 16 bits, when the HEW SIG-B 500 is configured for a 40 MHz bandwidth, the HEW SIG-B length field 504 may be 17 bits, and when the HEW SIG-B 500 is configured for an 80 or 160 MHz bandwidth, the HEW SIG-B length field 504 may be 19 bits.

In accordance with some embodiments, when configuring the HEW frame 100, the access point may refrain from including a bandwidth (BW) field (such as a legacy bandwidth field) in the HEW SIG-A1 field 104 (FIG. 1) and may convey a bandwidth indicator in the master-sync transmission. In these embodiments, the HEW SIG-A1 field 104 does not need a bandwidth indicator since the bandwidth of the PPDU may be indicated in the master-sync transmission. For legacy devices, such as VHT devices, a bandwidth indicator may be included in a conventional VHT SIG-B field. For legacy devices, such as non-VHT devices, a bandwidth indicator may be included in a conventional L-SIG.

In accordance with embodiments, the access point may transmit a master-sync transmission after obtaining access to the wireless channel (i.e., the medium). The master-sync transmission may be configured to allow a plurality of HEW devices (e.g., HEW compliant stations (STAs)) to synchronize with the access point and communicate in accordance with multiple access technique (e.g., an OFDMA technique). In some embodiments, the master-sync transmission may have a frame structure that can be received by legacy devices.

In some embodiments, the master-sync transmission may include a length indicator to indicate a length of a PPDU. In some embodiments, the length may be the PPDU length for each HEW device and may be implicit for each HEW device. For example, a start and a stop time may be indicated so that when combined with the knowledge of MCS, each HEW device is able to determine its PPDU length. In some embodiments, the length may be the same for several HEW devices. In one example embodiment, the master-sync frame may indicate the length for a group of HEW devices. In some embodiments, the master-sync transmission may include a schedule indicating channel resources for the plurality of HEW devices to communicate during the HEW OFDMA control period.

As discussed above, length may alternatively be indicated for SU HEW frames in a length field 214 (FIG. 2) in the HEW SIG-A1 200 (FIG. 2). For MU HEW frames, the length may be indicated in length field 504 (FIG. 5) of the HEW SIG-B 500 (FIG. 5). In some embodiments, the length may be indicated in the master-sync transmission as well as either the HEW SIG-A1 104/200 or HEW SIG-B 110/500.

Figure 6:
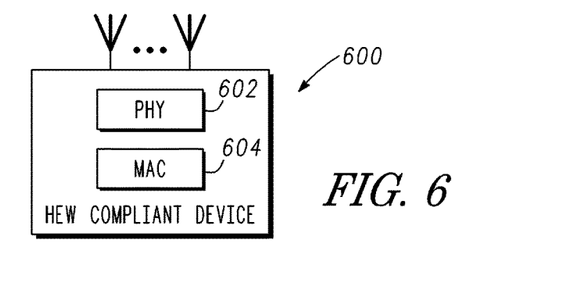
FIG. 6 illustrates an HEW compliant device in accordance with some embodiments.

FIG. 6 illustrates an HEW compliant device in accordance with some embodiments. HEW compliant device 600 may be any HEW compliant wireless communication device that may be arranged to communicate with one or more other HEW compliant devices as well as communicate with legacy devices. In some embodiments, HEW compliant device 600 may operate as a master scheduler, an access point, a base station or an enhanced node B (eNB). In other embodiments, HEW compliant device 600 may operate as a slave device, such as a HEW communication station. HEW compliant device 600 may be arrange to configure an HEW frame, such as HEW frame 100 (FIG. 1), for communicating with HEW compliant devices. In accordance with embodiments, HEW compliant device 600 may include, among other things, physical layer (PHY) 602 and medium-access control layer (MAC) 604. PHY 602 and MAC 604 may be HEW compliant layers and may also be compliant with one or more legacy IEEE 802.11 standards.

In some embodiments, HEW compliant device 600 may be arranged to perform methods for HEW communication. The methods may include configuring an HEW frame to include a first HEW signal field (HEW SIG-A1), the HEW SIG-A1 to include a single bit to indicate whether the HEW frame is a single user (SU) HEW frame or a multi-user (MU) HEW frame, refraining from including a legacy signal field (L-SIG) in the HEW frame, and transmitting the configured HEW frame as part of a packet protocol data unit (PPDU). Other method steps described herein may also be performed. In some embodiments, PHY 602 may include one or more transceivers for receiving and transmitting RF signals. In these embodiments, PHY 602 may include circuitry for modulation and demodulation, circuitry for up-conversion and down-conversion, filters, etc.

In some of these embodiments, the MAC 604 may be configured to cause HEW compliant device 600 to operate as a master scheduler for HEW compliant devices and may be responsible for contending for the medium. In these embodiments, HEW compliant device 600 may be contending with potentially other master devices or with legacy IEEE 802.11n/ac devices. When operating as a master device, the HEW compliant device 600 may send out a master-sync transmission once it has contended and gained access of the channel (e.g., received a TXOP). The master-sync transmission may allow the HEW stations to synchronize to the master device and have a time basis based on the master device and the master-sync transmission. The master-sync transmission may include a schedule for each HEW station to know the time and frequency resources they are going to receive packets and to be granted access to the medium during time the master has control of the channel. After the master-sync transmission, the HEW stations may be synchronized to the master. Additionally, the master station may have control of the wireless medium for a fixed amount of time to allow exchanges with HEW devices during the HEW control period.

As mentioned above, the HEW control period in which master has control of the medium for a fixed amount of time may allow exchanges of the HEW devices when legacy devices including IEEE 802.11n/ac devices are set to defer their transmission. Therefore, the rate field of L-SIG is not needed in an HEW frame when a master-sync transmission is transmitted a priori.

In accordance with some embodiments, the master-sync transmission may also include partial association ID (AID) information. The values may be set differently for SU and MU transmissions. The partial AID may provide an earlier indication to the PHY of a HEW station so it can determine if it is the intended recipient of the packet. In accordance with some embodiments, this information may be conveyed in the master-sync transmission and therefore there is no need for a partial AID field for HEW-specific transactions within the HEW control period (i.e., within HEW frames that follow the master-sync transmission).

In some embodiments, the HEW compliant device 600 may be configured to communicate using OFDM communication signals over a multicarrier communication channel. In some embodiments, HEW compliant device 600 may be configured to receive signals in accordance with specific communication standards, such as the Institute of Electrical and Electronics Engineers (IEEE) standards including IEEE 802.11-2012 and/or 802.11n-2009 standards and/or proposed specifications for WLANs including proposed HEW standards, although the scope of the invention is not limited in this respect as they may also be suitable to transmit and/or receive communications in accordance with other techniques and standards. In some other embodiments, HEW compliant device 600 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, HEW compliant device 600 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, HEW compliant device 600 may include one or more of a keyboard, a display, a non-volatile memory port, multiple antennas, a graphics processor, an application processor, speakers, and other mobile device elements. The display may be an LCD screen including a touch screen.

The antennas may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result between each of antennas and the antennas of a transmitting station.

Although HEW compliant device 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW compliant device 600 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In one example, a method for high-efficiency Wi-Fi (HEW) communication comprising: configuring an HEW frame to include a first HEW signal field (HEW SIG-A1), the HEW SIG-A1 to include a single bit to indicate whether the HEW frame is a single user (SU) HEW frame or a multi-user (MU) HEW frame; refraining from including a legacy signal field (L-SIG) in the HEW frame; and transmitting the configured HEW frame as part of a packet protocol data unit (PPDU).

In another example, configuring the HEW frame further comprises: including a preamble comprising a HEW long-training field (LTF) at the beginning of the HEW frame, the HEW LTF including a guard interval (GI), a long-training sequence (LTS) and a repeat of the LTS; and including the HEW SIG-A1 to immediately follow the HEW LTF in the HEW frame, and wherein refraining from including the L-SIG comprises refraining from including the L-SIG after the HEW LTF.

In another example, refraining from including the L-SIG comprises refraining from including a rate field, a length field and tail bits as part of the L-SIG, and wherein the method further includes: including rate information in one or more signal fields that follow the HEW SIG-A1; and including length information in either the HEW SIG-A1 or the one or more signal fields that follow the HEW SIG-A1.

In another example, configuring the HEW frame further comprises: including a length field in the HEW SIG-A1 to indicate a length of the PPDU when the HEW frame is an SU HEW frame; and refraining from including a length field in the HEW SIG-A1 when the HEW frame is a MU HEW frame.

In another example, configuring the HEW frame further comprises including a second HEW signal field (HEW SIG-A2) in the HEW frame, the HEW SIG-A2 is to immediately follow the HEW SIG-A1, wherein for SU HEW frames, the HEW SIG-A2 indicates at least rate information comprising a modulation and coding scheme (MCS) of a data field 112 of the HEW frame. The data field 112 may be configurable to comprise a variable number of coded OFDM symbols.

In another example, configuring the HEW frame further comprises: including HEW training symbols in the HEW frame immediately following the HEW SIG-A2; and including a third HEW signal field (HEW SIG-B) in the HEW frame to immediately following the HEW training symbols, wherein for MU HEW frames, the HEW SIG-B includes at least a length field to indicate a length of the PPDU and one or more fields to indicate a rate.

In another example, configuring the HEW frame further comprises: refraining from including a bandwidth (BW) field in the HEW SIG-A1 field; and conveying a bandwidth indicator in a master-sync transmission.

In another example, the indicated bandwidths include one of a 20 MHz bandwidth, a 40 MHz bandwidth, an 80 MHz bandwidth or a 160 MHz bandwidth, and wherein fields of the HEW SIG-B are configured based on the indicated bandwidth.

In another example, the method further comprises transmitting the master-sync transmission after obtaining access to a wireless channel, the master-sync transmission configured to allow a plurality of HEW devices to synchronize with an access point and communicate in accordance with multiple access technique.

In another example, the master-sync transmission includes a length indicator to indicate a length of the PPDU.

In another example, the master-sync transmission includes a schedule indicating channel resources for the plurality of HEW devices to communicate during an HEW OFDMA control period in accordance with an OFDMA technique, and wherein transmitting comprises transmitting the configured HEW frame in accordance with an OFDMA technique during the HEW OFDMA control period.

In another example, configuring the HEW frame further comprises including a second HEW LTF that includes an additional two long-training sequences, and wherein the second HEW LTF is included in the HEW frame immediately following the HEW LTF and prior to the HEW SIG-A1.

In another example, configuring the HEW frame further comprises: including the second HEW LTF when a signal-to-noise ratio (SNR) is below a predetermined level; and refraining from including the second HEW LTF when the SNR is not below a predetermined level.

In another example, a high-efficiency Wi-Fi (HEW) device comprises medium-access control layer circuitry (MAC) arranged to configure an HEW frame; and physical-layer circuitry (PHY) arranged to transmit the HEW frame, wherein the MAC is arranged to: configure the HEW frame to include a first HEW signal field (HEW SIG-A1), the HEW SIG-A1 to include a single bit to indicate whether the HEW frame is a single user (SU) HEW frame or a multi-user (MU) HEW frame; include rate information in one or more signal fields that follow the HEW SIG-A1; and include length information in either the HEW SIG-A1 or the one or more signal fields that follow the HEW SIG-A1.

In another example, the MAC is further arranged to: refrain from including a legacy signal field (L-SIG) in the HEW frame, the L-SIG being an IEEE 802.11 signal field, the L-SIG including a rate field, a length field and tail bits.

In another example, the MAC is further arranged to: include a preamble comprising a HEW long-training field (LTF) at the beginning of the HEW frame, the HEW LTF including a guard interval (GI), a long-training sequence (LTS) and a repeat of the LTS; include the HEW SIG-A1 to immediately follow the HEW LTF in the HEW frame; and refrain from including the L-SIG after the HEW LTF.

In another example, the MAC is to: further configure the HEW frame to include a length field in the HEW SIG-A1 to indicate a length of the PPDU when the HEW frame is an SU HEW frame; and refrain from including a length field in the HEW SIG-A1 when the HEW frame is a MU HEW frame.

In another example, the MAC is to further configure the HEW frame to include a second HEW signal field (HEW SIG-A2) in the HEW frame, the HEW SIG-A2 is to immediately follow the HEW SIG-A1, and wherein for SU HEW frames, the HEW SIG-A2 indicates at least rate information comprising a modulation and coding scheme (MCS) of a data field 112 of the HEW frame, the data field 112 configurable to comprise a variable number of coded OFDM symbols.

In another example, a non-transitory computer-readable storage medium that stores instructions for execution by one or more processors to perform operations for high-efficiency Wi-Fi (HEW) communications is provided. The operations comprise: configuring an HEW frame to include a first HEW signal field (HEW SIG-A1), the HEW SIG-A1 to include a single bit to indicate whether the HEW frame is a single user (SU) HEW frame or a multi-user (MU) HEW frame; refraining from including a legacy signal field (L-SIG) in the HEW frame; and causing a physical layer to transmit the configured HEW frame as part of a packet protocol data unit (PPDU).

In another example, refraining from including the L-SIG comprises refraining from including a rate field, a length field and tail bits as part of the L-SIG, and wherein the operations further include: including rate information in one or more signal fields that follow the HEW SIG-A1; and including length information in either the HEW SIG-A1 or the one or more signal fields that follow the HEW SIG-A1, and wherein configuring the HEW frame further comprises: including a preamble comprising a HEW long-training field (LTF) at the beginning of the HEW frame, the HEW LTF including a guard interval (GI), a long-training sequence (LTS) and a repeat of the LTS; and including the HEW SIG-A1 to immediately follow the HEW LTF in the HEW frame.

In another example, a wireless communication device configured for high-efficiency Wi-Fi (HEW) communicating comprises: one or more antennas; medium-access control layer circuitry (MAC) arranged to configure an HEW frame; and physical-layer circuitry (PHY) arranged to transmit the HEW frame using the one or more antennas, wherein the MAC is arranged to: configure the HEW frame to include a first HEW signal field (HEW SIG-A1), the HEW SIG-A1 to include a single bit to indicate whether the HEW frame is a single user (SU) HEW frame or a multi-user (MU) HEW frame; include rate information in one or more signal fields that follow the HEW SIG-A1; and include length information in either the HEW SIG-A1 or the one or more signal fields that follow the HEW SIG-A1.

In another example, the MAC is further arranged to: include a preamble comprising a HEW long-training field (LTF) at the beginning of the HEW frame, the HEW LTF including a guard interval (GI), a long-training sequence (LTS) and a repeat of the LTS; include the HEW SIG-A1 to immediately follow the HEW LTF in the HEW frame; and refrain from including a legacy signal field (L-SIG) in the HEW frame after the HEW LTF, the L-SIG being an IEEE 802.11 signal field.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for high-efficiency Wi-Fi (HEW) communication comprising:
    configuring an HEW frame to include a first HEW signal field (HEW SIG-A1), the HEW SIG-A1 to include a single bit to indicate whether the HEW frame is a single user (SU) HEW frame or a multi-user (MU) HEW frame;
    refraining from including a legacy signal field (L-SIG) in the HEW frame; and
    transmitting the configured HEW frame as part of a packet protocol data unit (PPDU).

2. The method of claim 1 wherein configuring the HEW frame further comprises:
    including a preamble comprising a HEW long-training field (LTF) at the beginning of the HEW frame, the HEW LTF including a guard interval (GI), a long-training sequence (LTS) and a repeat of the LTS; and
    including the HEW SIG-A1 to immediately follow the HEW LTF in the HEW frame, and
    wherein refraining from including the L-SIG comprises refraining from including the L-SIG after the HEW LTF.

3. The method of claim 2 wherein configuring the HEW frame further comprises:
    including a length field in the HEW SIG-A1 to indicate a length of the PPDU when the HEW frame is an SU HEW frame; and
    refraining from including a length field in the HEW SIG-A1 when the HEW frame is a MU HEW frame.

4. The method of claim 2 wherein configuring the HEW frame further comprises including a second HEW signal field (HEW SIG-A2) in the HEW frame, the HEW SIG-A2 is to immediately follow the HEW SIG-A1,
    wherein for SU HEW frames, the HEW SIG-A2 indicates at least rate information comprising a modulation and coding scheme (MCS) of a data field 112 of the HEW frame, the data field 112 configurable to comprise a variable number of coded OFDM symbols.

5. The method of claim 4 wherein configuring the HEW frame further comprises:
    including HEW training symbols in the HEW frame immediately following the HEW SIG-A2; and
    including a third HEW signal field (HEW SIG-B) in the HEW frame to immediately following the HEW training symbols,
    wherein for MU HEW frames, the HEW SIG-B includes at least a length field to indicate a length of the PPDU and one or more fields to indicate a rate.

6. The method of claim 5 wherein configuring the HEW frame further comprises:
    refraining from including a bandwidth (BW) field in the HEW SIG-A1 field; and
    conveying a bandwidth indicator in a master-sync transmission.

7. The method of claim 6 wherein the indicated bandwidths include one of a 20 MHz bandwidth, a 40 MHz bandwidth, an 80 MHz bandwidth or a 160 MHz bandwidth, and
    wherein fields of the HEW SIG-B are configured based on the indicated bandwidth.

8. The method of claim 6 further comprising transmitting the master-sync transmission after obtaining access to a wireless channel, the master-sync transmission configured to allow a plurality of HEW devices to synchronize with an access point and communicate in accordance with multiple access technique.

9. The method of claim 6 wherein the master-sync transmission includes a length indicator to indicate a length of the PPDU.

10. The method of claim 6 wherein the master-sync transmission includes a schedule indicating channel resources for the plurality of HEW devices to communicate during an HEW OFDMA control period in accordance with an OFDMA technique, and
    wherein transmitting comprises transmitting the configured HEW frame in accordance with an OFDMA technique during the HEW OFDMA control period.

11. The method of claim 6 wherein configuring the HEW frame further comprises including a second HEW LTF that includes an additional two long-training sequences, and
    wherein the second HEW LTF is included in the HEW frame immediately following the HEW LTF and prior to the HEW SIG-A1.

12. The method of claim 11 wherein configuring the HEW frame further comprises:
    including the second HEW LTF when a signal-to-noise ratio (SNR) is below a predetermined level; and
    refraining from including the second HEW LTF when the SNR is not below a predetermined level.

13. The method of claim 1 wherein refraining from including the L-SIG comprises refraining from including a rate field, a length field and tail bits as part of the L-SIG, and
    wherein the method further includes:
    including rate information in one or more signal fields that follow the HEW SIG-A1; and
    including length information in either the HEW SIG-A1 or the one or more signal fields that follow the HEW SIG-A1.

14. A high-efficiency Wi-Fi (HEW) device comprising:
    medium-access control layer circuitry (MAC) arranged to configure an HEW frame; and
    physical-layer circuitry (PHY) arranged to transmit the HEW frame, wherein the MAC is arranged to:
configure the HEW frame to include a first HEW signal field (HEW SIG-A1), the HEW SIG-A1 to include a single bit to indicate whether the HEW frame is a single user (SU) HEW frame or a multi-user (MU) HEW frame;
include rate information in one or more signal fields that follow the HEW SIG-A1; and
include length information in either the HEW SIG-A1 or the one or more signal fields that follow the HEW SIG-A1.

15. The HEW device of claim 14 wherein the MAC is further arranged to refrain from including a legacy signal field (L-SIG) in the HEW frame, the L-SIG being an IEEE 802.11 signal field, the L-SIG including a rate field, a length field and tail bits.

16. The HEW device of claim 14 wherein the MAC is further arranged to:
include a preamble comprising a HEW long-training field (LTF) at the beginning of the HEW frame, the HEW LTF including a guard interval (GI), a long-training sequence (LTS) and a repeat of the LTS;
include the HEW SIG-A1 to immediately follow the HEW LTF in the HEW frame; and
refrain from including the L-SIG after the HEW LTF.

17. The HEW device of claim 16 wherein the MAC is to:
further configure the HEW frame to include a length field in the HEW SIG-A1 to indicate a length of the PPDU when the HEW frame is an SU HEW frame; and
refrain from including a length field in the HEW SIG-A1 when the HEW frame is a MU HEW frame.

18. The HEW device of claim 17 wherein the MAC is to further configure the HEW frame to include a second HEW signal field (HEW SIG-A2) in the HEW frame, the HEW SIG-A2 is to immediately follow the HEW SIG-A1, and
wherein for SU HEW frames, the HEW SIG-A2 indicates at least rate information comprising a modulation and coding scheme (MCS) of a data field 112 of the HEW frame, the data field 112 configurable to comprise a variable number of coded OFDM symbols.

19. A non-transitory computer-readable storage medium that stores instructions for execution by one or more processors to perform operations for high-efficiency Wi-Fi (HEW) communications, the operations comprising:
configuring an HEW frame to include a first HEW signal field (HEW SIG-A1), the HEW SIG-A1 to include a single bit to indicate whether the HEW frame is a single user (SU) HEW frame or a multi-user (MU) HEW frame;
refraining from including a legacy signal field (L-SIG) in the HEW frame; and
causing a physical layer to transmit the configured HEW frame as part of a packet protocol data unit (PPDU).

20. The non-transitory computer-readable storage medium of claim 19 wherein refraining from including the L-SIG comprises refraining from including a rate field, a length field and tail bits as part of the L-SIG, and
wherein the operations further include:
including rate information in one or more signal fields that follow the HEW SIG-A1; and
including length information in either the HEW SIG-A1 or the one or more signal fields that follow the HEW SIG-A1, and
wherein configuring the HEW frame further comprises:
including a preamble comprising a HEW long-training field (LTF) at the beginning of the HEW frame, the HEW LTF including a guard interval (GI), a long-training sequence (LTS) and a repeat of the LTS; and
including the HEW SIG-A1 to immediately follow the HEW LTF in the HEW frame.

21. A wireless communication device configured for high-efficiency Wi-Fi (HEW) communicating comprising:
one or more antennas;
medium-access control layer circuitry (MAC) arranged to configure an HEW frame; and
physical-layer circuitry (PHY) arranged to transmit the HEW frame using the one or more antennas,
wherein the MAC is arranged to:
configure the HEW frame to include a first HEW signal field (HEW SIG-A1), the HEW SIG-A1 to include a single bit to indicate whether the HEW frame is a single user (SU) HEW frame or a multi-user (MU) HEW frame;
include rate information in one or more signal fields that follow the HEW SIG-A1; and
include length information in either the HEW SIG-A1 or the one or more signal fields that follow the HEW SIG-A1.

22. The wireless communication device of claim 21 wherein the MAC is further arranged to:
include a preamble comprising a HEW long-training field (LTF) at the beginning of the HEW frame, the HEW LTF including a guard interval (GI), a long-training sequence (LTS) and a repeat of the LTS;
include the HEW SIG-A1 to immediately follow the HEW LTF in the HEW frame; and
refrain from including a legacy signal field (L-SIG) in the HEW frame after the HEW LTF, the L-SIG being an IEEE 802.11 signal field.

23. A high-efficiency Wi-Fi (HEW) device comprising physical-layer circuitry (PHY) arranged to receive and an HEW frame and processing circuitry arranged to decode fields of the HEW frame,
wherein the HEW frame includes a first HEW signal field (HEW SIG-A1), the HEW SIG-A1 including a single bit to indicate whether the HEW frame is a single user (SU) HEW frame or a multi-user (MU) HEW frame,
wherein rate information is included in one or more signal fields that follow the HEW SIG-A1, and
wherein length information is included in either the HEW SIG-A1 or the one or more signal fields that follow the HEW SIG-A1.

24. The HEW device of claim 23 wherein the HEW frame does not include a legacy signal field (L-SIG), the L-SIG being an IEEE 802.11 signal field, the L-SIG including a rate field, a length field and tail bits.

25. The HEW device of claim 23 wherein the HEW frame:
includes a preamble comprising a HEW long-training field (LTF) at the beginning of the HEW frame, the HEW LTF including a guard interval (GI), a long-training sequence (LTS) and a repeat of the LTS,
wherein the HEW SIG-A1 immediately follows the HEW LTF in the HEW frame, and
wherein the L-SIG is not included after the HEW LTF.

26. The HEW device of claim 25 wherein the HEW frame includes a length field in the HEW SIG-A1 to indicate a length of the PPDU when the HEW frame is an SU HEW frame; and
wherein the HEW frame does not include the length field in the HEW SIG-A1 when the HEW frame is a MU HEW frame.

* * * * *